US012793455B2

(12) United States Patent
Yokose et al.

(10) Patent No.: US 12,793,455 B2
(45) Date of Patent: Nov. 10, 2026

(54) DETERMINATION DEVICE, DETERMINATION METHOD, AND DETERMINATION PROGRAM

(71) Applicant: NTT, Inc., Tokyo (JP)

(72) Inventors: Fumihiro Yokose, Tokyo (JP); Kimio Tsuchikawa, Tokyo (JP); Sayaka Yagi, Tokyo (JP); Yuki Urabe, Tokyo (JP); Taisuke Wakasugi, Tokyo (JP); Haruo Oishi, Tokyo (JP)

(73) Assignee: NTT, Inc., Tokyo (JP)

( * ) Notice: Subject to any disclaimer, the term of this patent is extended or adjusted under 35 U.S.C. 154(b) by 342 days.

(21) Appl. No.: 18/568,347

(22) PCT Filed: Jun. 11, 2021

(86) PCT No.: PCT/JP2021/022417
§ 371 (c)(1),
(2) Date: Dec. 8, 2023

(87) PCT Pub. No.: WO2022/259558
PCT Pub. Date: Dec. 15, 2022

(65) Prior Publication Data
US 2024/0282134 A1 Aug. 22, 2024

(51) Int. Cl.
*G06V 30/00* (2022.01)
*G06V 30/16* (2022.01)
*G06V 30/19* (2022.01)
*G06V 30/30* (2022.01)

(52) U.S. Cl.
CPC .... *G06V 30/1613* (2022.01); *G06V 30/19013* (2022.01); *G06V 30/30* (2022.01)

(58) Field of Classification Search
None
See application file for complete search history.

(56) References Cited

U.S. PATENT DOCUMENTS

2017/0103215 A1* 4/2017 Mahaffey .............. G06F 21/554
2019/0042562 A1* 2/2019 Bull ...................... G06F 40/211

OTHER PUBLICATIONS

Yokose et al. (2020) "Business visualization technology that contributes to the promotion of DX" NTT Technical Journal vol. 32, No. 2, pp. 72-75.

* cited by examiner

*Primary Examiner* — Tuankhanh D Phan

(57) ABSTRACT

A determination device (10) includes: a reception unit (15*a*) that receives operation events; an estimation unit (15*b*) that estimates a determination criterion for determining identity of the operation events on the basis of an attribute value of an operation log included in the operation events; and a determination unit (15*c*) that determines identity for an operation event to be processed on the basis of the determination criterion.

20 Claims, 11 Drawing Sheets

Fig. 2

| DATE AND TIME | OPERATION TYPE | URL | TITLE | tag Name | type | id | value | name | class Name | left | top | width | height |
|---|---|---|---|---|---|---|---|---|---|---|---|---|---|
| 2021/03/10 12:02:10 | "input" | "http://www.sample.jp/transit/?session=0001" | "ROUTE SEARCH" | "input" | "text" | null | "YRP NOBI" | "on_st" | null | 217 | 84 | 195 | 24 |
| 2021/03/10 12:02:52 | "input" | "http://www.sample.jp/transit/?session=0001" | "ROUTE SEARCH" | "input" | "text" | null | "TSUKUBA" | "off_st" | null | 217 | 120 | 195 | 24 |
| 2021/03/10 12:03:23 | "select" | "http://www.sample.jp/transit/?session=0001" | "ROUTE SEARCH" | "select" | null | null | "13" | "Time_Hour" | null | 217 | 228 | 54 | 24 |
| 2021/03/10 12:03:36 | "select" | "http://www.sample.jp/transit/?session=0001" | "ROUTE SEARCH" | "select" | null | null | "15" | "Time_Minute" | null | 271 | 228 | 54 | 24 |
| 2021/03/10 12:03:59 | "click" | http://www.hoge.jp/info/ | "INFORMATION CONFIRMATION" | "a" | null | null | null | null | null | 250 | 303 | 224 | 10 |
| 2021/03/10 12:04:42 | "click" | http://www.hoge.jp/info/ | "INFORMATION CONFIRMATION" | "button" | "button" | "id_001" | null | null | null | 524 | 620 | 150 | 32 |
| 2021/03/10 12:05:06 | "check" | "http://www.sample.jp/transit/?session=0001" | "ROUTE SEARCH" | "input" | "radio" | null | "1" | "sr" | null | 280 | 268 | 13 | 13 |
| 2021/03/10 12:05:19 | "click" | "http://www.sample.jp/transit/?session=0001" | "ROUTE SEARCH" | "input" | "submit" | null | "SEARCH" | null | null | 239 | 372 | 120 | 32 |
| ⋮ | ⋮ | ⋮ | ⋮ | ⋮ | ⋮ | ⋮ | ⋮ | ⋮ | ⋮ | ⋮ | ⋮ | ⋮ | ⋮ |

Fig. 4

| ATTRIBUTE ELEMENT | DETERMINATION METHOD USED |
|---|---|
| DATE AND TIME | D. NOT USED FOR DETERMINATION |
| OPERATION TYPE | A. DETERMINE CHARACTER STRING BY EXACT MATCH |
| URL | B. DETERMINE CHARACTER STRING BY PARTIAL MATCH |
| TITLE | B. DETERMINE CHARACTER STRING BY PARTIAL MATCH |
| tagName | A. DETERMINE CHARACTER STRING BY EXACT MATCH |
| type | A. DETERMINE CHARACTER STRING BY EXACT MATCH |
| id | A. DETERMINE CHARACTER STRING BY EXACT MATCH |
| value | D. NOT USED FOR DETERMINATION |
| name | A. DETERMINE CHARACTER STRING BY EXACT MATCH |
| className | D. NOT USED FOR DETERMINATION |
| left | D. NOT USED FOR DETERMINATION |
| top | D. NOT USED FOR DETERMINATION |
| width | C. PERFORM DETERMINATION BY NUMERICAL RANGE |
| height | C. PERFORM DETERMINATION BY NUMERICAL RANGE |

Fig. 5

| DATE AND TIME | OPERATION TYPE | URL | TITLE | tag Name | type | id | value | name | class Name | left | top | width | height | |
|---|---|---|---|---|---|---|---|---|---|---|---|---|---|---|
| 2021/03/10 12:02:10 | "input" | "http://www.sample.jp/transit/session=0001" | "ROUTE SEARCH" | "input" | "text" | null | | | | 217 | 84 | 195 | 24 | |
| 2021/03/10 12:11:08 | "input" | "http://www.sample.jp/transit/session=0002" | "ROUTE SEARCH" | "input" | "text" | null | | | | 217 | 120 | 195 | 24 | |
| D. ITEM NOT USED FOR DETERMINATION | A. CHARACTER STRING DETERMINED BY EXACT MATCH | B. CHARACTER STRING DETERMINED BY PARTIAL MATCH | B. CHARACTER STRING DETERMINED BY PARTIAL MATCH | A. CHARACTER STRING DETERMINED BY EXACT MATCH | A. CHARACTER STRING DETERMINED BY EXACT MATCH | A. CHARACTER STRING DETERMINED BY EXACT MATCH | | | | D. ITEM NOT USED FOR DETERMINATION | D. ITEM NOT USED FOR DETERMINATION | C. ITEM DETERMINED BY NUMERICAL RANGE | C. ITEM DETERMINED BY NUMERICAL RANGE | |
| REJECTED | ADOPTED | ADOPTED | ADOPTED | ADOPTED | ADOPTED | ADOPTED | | | | REJECTED | REJECTED | ADOPTED | ADOPTED | |

SECOND STAGE

| DATE AND TIME | OPERATION TYPE | URL | TITLE | tag Name | type | id | value | name | class Name | left | top | width | height | |
|---|---|---|---|---|---|---|---|---|---|---|---|---|---|---|
| 2021/03/10 12:05:19 | "click" | "http://www.sample.jp/transit/session=0001" | "ROUTE SEARCH" | "button" | null | null | | | | 239 | 372 | 120 | 32 | |
| 2021/03/10 13:59:27 | "click" | "http://www.sample.jp/transit/session=0002" | "ROUTE SEARCH" | "button" | null | null | | | | 239 | 372 | 120 | 32 | |
| D. ITEM NOT USED FOR DETERMINATION | A. CHARACTER STRING DETERMINED BY EXACT MATCH | B. CHARACTER STRING DETERMINED BY PARTIAL MATCH | B. CHARACTER STRING DETERMINED BY PARTIAL MATCH | A. CHARACTER STRING DETERMINED BY EXACT MATCH | A. CHARACTER STRING DETERMINED BY EXACT MATCH | A. CHARACTER STRING DETERMINED BY EXACT MATCH | | | | D. ITEM NOT USED FOR DETERMINATION | D. ITEM NOT USED FOR DETERMINATION | C. ITEM DETERMINED BY NUMERICAL RANGE | C. ITEM DETERMINED BY NUMERICAL RANGE | |
| REJECTED | ADOPTED | ADOPTED | ADOPTED | ADOPTED | ADOPTED | ADOPTED | | | | REJECTED | REJECTED | ADOPTED | ADOPTED | |

Fig. 10

| DATE AND TIME | OPERATION TYPE | URL | TITLE | tag Name | type | id | value | name | class Name | left | top | width | height |
|---|---|---|---|---|---|---|---|---|---|---|---|---|---|
| 2021/03/10 12:02:10 | "input" | "http://www.sample.jp/transit/?session=0001" | "ROUTE SEARCH" | "input" | "text" | null | "YRP NOBI" | "on_st" | null | 217 | 64 | 185 | 24 |
| 2021/03/10 12:02:52 | "input" | "http://www.sample.jp/transit/?session=0001" | "ROUTE SEARCH" | "input" | "text" | null | "TSUKUBA" | "off_st" | null | 217 | 120 | 185 | 24 |
| 2021/03/10 12:03:23 | "select" | "http://www.sample.jp/transit/?session=0001" | "ROUTE SEARCH" | "select" | null | null | "13" | "Time_Hour" | null | 217 | 228 | 54 | 24 |
| 2021/03/10 12:03:30 | "select" | "http://www.sample.jp/transit/?session=0001" | "ROUTE SEARCH" | "select" | null | null | "15" | "Time_Minute" | null | 271 | 228 | 54 | 24 |
| 2021/03/10 12:03:59 | "click" | http://www.hoge.jp/info/ | "INFORMATION CONFIRMATION" | "a" | null | null | null | null | null | 250 | 303 | 224 | 10 |
| 2021/03/10 12:04:42 | "click" | http://www.hoge.jp/info/ | "INFORMATION CONFIRMATION" | "button" | "button" | "id_001" | null | null | null | 524 | 620 | 150 | 32 |
| 2021/03/10 12:05:06 | "check" | "http://www.sample.jp/transit/?session=0001" | "ROUTE SEARCH" | "input" | "radio" | null | "1" | "sr" | null | 230 | 266 | 13 | 13 |
| 2021/03/10 12:05:19 | "click" | "http://www.sample.jp/transit/?session=0001" | "ROUTE SEARCH" | "input" | "submit" | null | "SEARCH" | null | null | 239 | 372 | 120 | 32 |
| ⋮ | ⋮ | ⋮ | ⋮ | ⋮ | ⋮ | ⋮ | ⋮ | ⋮ | ⋮ | ⋮ | ⋮ | ⋮ | ⋮ |

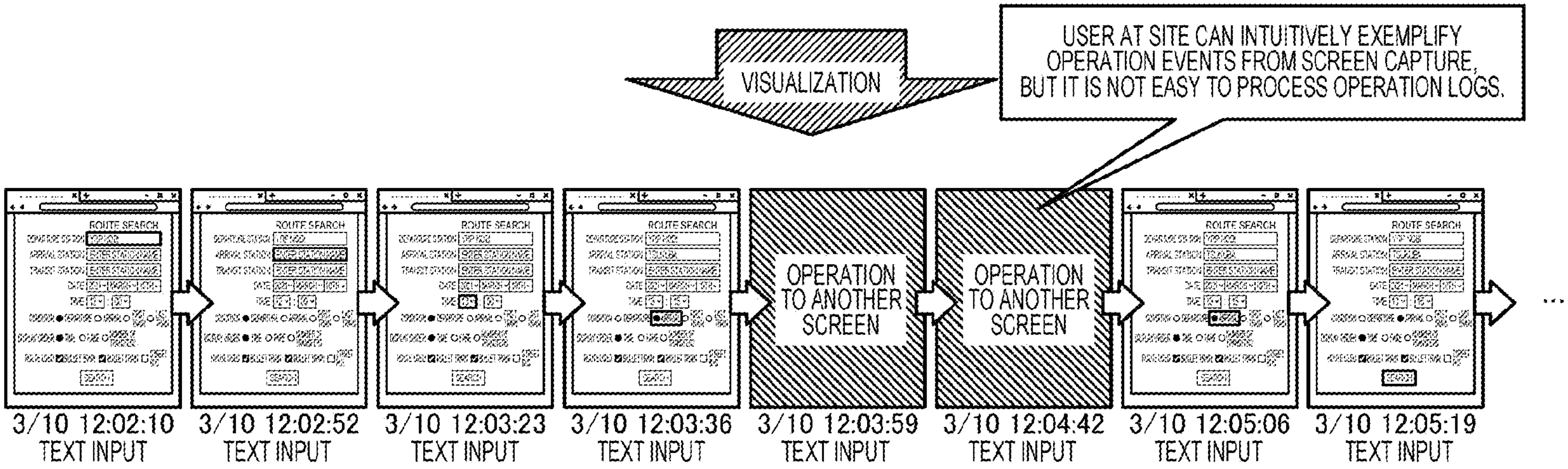

DETERMINATION DEVICE, DETERMINATION METHOD, AND DETERMINATION PROGRAM

CROSS-REFERENCE TO RELATED APPLICATIONS

This application is a U.S. 371 Application of International Patent Application No. PCT/JP2021/022417, filed on 11 Jun. 2021, the disclosure of which is hereby incorporated herein by reference in its entirety.

TECHNICAL FIELD

The present invention relates to a determination device, a determination method, and a determination program.

BACKGROUND ART

Conventionally, there has been known a process mining method of analyzing and visualizing a flow of work performed in business to find an improvement point in the business. Information used for analysis and visualization in such a process mining method is a log in which an event to be analyzed is recorded. For example, there are various events to be analyzed depending on a type of business and granularity to be analyzed, but for example, a graphical user interface (GUI) operation may be targeted, such as "clicking a button" or "inputting to a text box".

The log used for process mining needs to satisfy, for example, requirements that the log is "narrowed down to only information to be analyzed", "divided for each case", and "in a state where an event can be identified". For example, an operation log in which an operation on a personal computer (PC) is recorded often does not satisfy the requirements of the log used for the process mining. For that reason, when the process mining is performed, for example, the operation log needs to be processed to satisfy the requirements by three pieces of pre-processing, "removal of an unnecessary operation event", "determination of identical operation events", and "division in units of cases".

Here, processing of "determination of an identical operation" is processing of determining operations having an identical meaning in the operation log and making the operations identifiable as work events. That is, in the operation log, only information of the GUI at the time of recording is recorded as it is, and thus, all the operations are separate events in an initial state. For that reason, it is necessary to perform processing of identifying identical events in consideration of meanings of operations in work. Conventionally, in analysis and visualization of an operation on a PC for finding an improvement point in business, a person manually performs processing of connecting identical operation events with each other, for example, by visually confirming an operation log and adding a unique operation type ID to a plurality of events regarded as identical.

CITATION LIST

Non Patent Literature

Non Patent Literature 1: Yokose, Urabe, Yagi, et al., "Business visualization technology contributing to DX promotion", 2020, NTT Technical Journal, 2020 vol.32 No. 2, p. 72-75, [online], [Searched on Apr. 23, 2021], Internet <https://journal.ntt.co.jp/article/880>

SUMMARY OF INVENTION

Technical Problem

However, in the above-described conventional technique, the identical operation events cannot be easily connected with each other in the pre-processing for the process mining. This is because the above-described conventional technique has the following problems.

First, since identical operations cannot be determined on the operation log, it is necessary to connect the identical operation events with each other. In addition, it is possible to manually connect them with each other one by one, but in a case where there are a large amount of logs, it is difficult to manually connect them with each other all.

On the other hand, since systems to be analyzed in the process mining have different internal structures, connection cannot be automatically determined by a fixed rule algorithm. In addition, it is also possible to cope with this by manually customizing the rule algorithm in accordance with the internal structures and work of the systems, but it is necessary to understand the internal structures of the systems and meanings of attribute values included in the operation log, so that it is difficult for a general user.

Solution to Problem

To solve the above-described problems and achieve an object, a determination device according to the present invention includes: a reception unit that receives log events; an estimation unit that estimates a determination criterion for determining identity of the log events on the basis of an attribute value of a log included in the log events; and a determination unit that determines identity for a log event to be processed on the basis of the determination criterion.

In addition, a determination method according to the present invention is a determination method executed by a determination device, and the determination method includes: a process of receiving log events; a process of estimating a determination criterion for determining identity of the log events on the basis of an attribute value of a log included in the log events; and a process of determining identity for a log event to be processed on the basis of the determination criterion.

In addition, a determination program according to the present invention causes a computer to execute: a step of receiving log events; a step of estimating a determination criterion for determining identity of the log events on the basis of an attribute value of a log included in the log events; and a step of determining identity for a log event to be processed on the basis of the determination criterion.

Advantageous Effects of Invention

In the present invention, the identical operation events can be easily connected with each other in the pre-processing for the process mining.

BRIEF DESCRIPTION OF DRAWINGS

FIG. 2 is a diagram illustrating a log stored in a storage unit according to the first embodiment.

FIG. 4 is a diagram illustrating an example of a rule type for each of attribute elements according to the first embodiment.

FIG. 5 is a diagram illustrating an example of determination criterion estimation processing according to the first embodiment.

FIG. 10 is a diagram for explaining a conventional problem.

DESCRIPTION OF EMBODIMENTS

Figure 1:
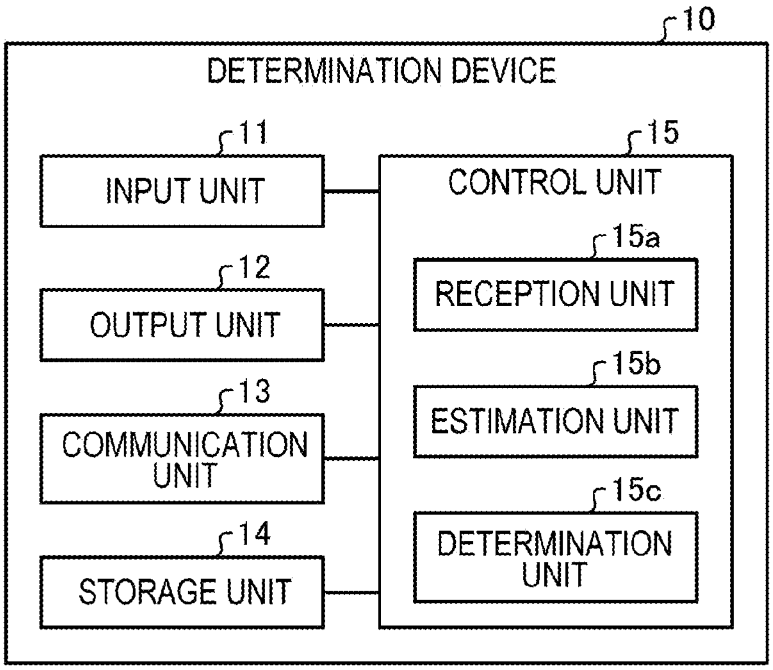
FIG. 1 is a block diagram illustrating a configuration example of a determination device according to a first embodiment.

Hereinafter, embodiments of a determination device, a determination method, and a determination program according to the present invention will be described in detail with reference to the drawings. In addition, the present invention is not limited to the embodiments described below.

[First Embodiment]

Hereinafter, processing performed by a determination system, a configuration of a determination device 10, details of each of pieces of processing, and a flow of each of pieces of processing according to a first embodiment (as appropriate, a present embodiment) will be sequentially described, and finally, effects of the present embodiment will be described.

[Processing Performed By Determination System]

Hereinafter, processing performed by the determination system (as appropriate, the present system) according to the present embodiment will be described. The present system is used for processing an operation log in which an operation on a PC is recorded, and particularly executes automatic determination processing for identical operation events by the user's exemplification. Hereinafter, the processing performed by the present system will be described in comparison with a conventional technique.

The process mining method for business analysis described above is widely used in the market. In addition, there is also a mechanism for recording the operation on the PC as a log (operation log). At this time, pre-processing may be required to perform process mining on the operation log. That is, since identical operations cannot be determined on the operation log, it is necessary to connect identical operation events with each other. In addition, it is possible to manually connect them with each other one by one, but in a case where there are a large amount of logs, it is difficult to manually connect them with each other all.

On the other hand, since systems to be analyzed in the process mining have different internal structures, connection cannot be automatically determined by a fixed rule algorithm. In addition, it is also possible to cope with this by manually customizing the rule algorithm in accordance with the internal structures and work of the systems, but it is necessary to understand the internal structures of the systems and meanings of attribute values included in the operation log.

Thus, in the present system, the following processing is executed. First, a user is caused to exemplify a plurality of common operation events, that is, operation events for which identity is determined. Second, a rule for determining a connection is estimated from a relationship of attribute values between the exemplified operation events. Third, the identical operation events are automatically determined by using the estimated rule. According to the above processing, it is possible to automatically perform connection of the identical operation events by the user's exemplification even if there is no deep understanding of an internal structure of a system to be analyzed and the attribute values of the operation log.

[Configuration of Determination Device 10]

A configuration of the determination device 10 according to the present embodiment will be described in detail with reference to FIG. 1. FIG. 1 is a block diagram illustrating a configuration example of the determination device according to the present embodiment. The determination device 10 includes an input unit 11, an output unit 12, a communication unit 13, a storage unit 14, and a control unit 15.

The input unit 11 manages input of various types of information to the determination device 10. For example, the input unit 11 is implemented by a mouse, a keyboard, or the like, and receives an input of setting information or the like to the determination device 10. In addition, the output unit 12 manages output of various types of information from the determination device 10. For example, the output unit 12 is implemented by a display or the like, and outputs setting information or the like stored in the determination device 10.

The communication unit 13 manages data communication with other devices. For example, the communication unit 13 performs data communication with each of communication devices. In addition, the communication unit 13 can perform data communication with an operator's terminal (not illustrated).

The storage unit 14 stores various types of information referred to when the control unit 15 operates, and stores various types of information acquired when the control unit 15 operates. Here, the storage unit 14 can be implemented by, for example, a semiconductor memory device such as a random access memory (RAM) or a flash memory, a storage device such as a hard disk or an optical disk, or the like. Note that, in the example of FIG. 1, the storage unit 14 is installed inside the determination device 10, but may be installed outside the determination device 10, or a plurality of storage units may be installed.

The storage unit 14 stores an operation log to be processed. For example, the storage unit 14 stores, as the operation log, "occurrence time" of the operation, "unique information on an operated GUI component", and the like. In addition, in the operation log, information on one operation event is expressed as a collection of a plurality of attribute values (columns, items).

Here, the operation log stored in the storage unit 14 will be described with reference to FIG. 2. FIG. 2 is a diagram illustrating a log stored in the storage unit 14. In the example of FIG. 2, to simplify the example, an operation log is assumed in which only an operation on a browser is recorded. For that reason, attribute values of the log indicate only those related to the browser.

Note that, in the operation log, in addition to a GUI operation on the PC, input by some input device may be recorded, or command input on a character-based user interface (CUI) may be recorded. In a case of recording these other types of operations, it is necessary to increase the number of log items as necessary.

As illustrated in FIG. 2, the storage unit 14 stores "date and time", "operation type", "URL", "title", "tagName", "type", "id", "value", "name", "className", "left", "top", "width", and "height". Note that operation logs to be stored are not limited to those described above, and the storage unit 14 may also store, for example, image capture or the like at the time of operation.

In the example of FIG. 2, in a case where an item of an operation is not set or cannot be acquired, the storage unit 14 stores a "null" value indicating that a value of the operation is not set. Note that an attribute element included in the operation log does not need to be directly acquired information itself, and may be processed, obtained by combining a plurality of pieces of information, or processed by using information not included in the operation log finally. In addition, the storage unit 14 stores the operation logs in chronological order of events so that the order of the events occurring in work can be known.

The control unit 15 manages control of the entire determination device 10. The control unit 15 includes a reception unit 15*a*, an estimation unit 15*b*, and a determination unit 15*c*. Here, the control unit 15 is, for example, an electronic circuit such as a central processing unit (CPU) or a micro processing unit (MPU), or an integrated circuit such as an application specific integrated circuit (ASIC) or a field programmable gate array (FPGA).

(Reception Unit 15*a*)

The reception unit 15*a* receives an operation event as a log event. For example, the reception unit 15*a* receives images of operation events associated with each other by a user as identical operations among images of a plurality of operation events. That is, the reception unit 15*a* receives, among captured images of a plurality of operation events displayed in chronological order, a combination of the captured images associated with each other by the user as identical operations. Here, the log event is an event including a log having a similar structure (for example, a reception/transmission history of a telephone, and the like) in addition to the operation event.

Describing using a specific example, in a case where a plurality of operation events is selected by a click operation by the user on the captured images visually displayed chronologically on a screen of the user's terminal, the reception unit 15*a* receives operation logs of operation events associated with the selected captured images as "identical operation logs". Further, in a case where a plurality of other operation events is selected, the reception unit 15*a* receives operation logs of operation events associated with the selected captured images as other "identical operation logs". Note that reception processing described above will also be described in detail in [Details of each of pieces of processing] (1. Processing of receiving exemplification by connection of operation events) described later.

The reception unit 15*a* refers to the operation log stored in the storage unit 14 and acquires a selected operation log. On the other hand, the reception unit 15*a* outputs a set of selected operation logs to the estimation unit 15*b*. Note that the reception unit 15*a* may store the set of the selected operation logs in the storage unit 14.

(Estimation Unit 15*b*)

The estimation unit 15*b* estimates, as a log event, a determination criterion (rule) for determining the identity of the operation events on the basis of the attribute value of the operation log included in the operation. For example, the estimation unit 15*b* estimates a determination criterion for determining the identity of the operation events by extracting the attribute value common of the operation log. That is, the estimation unit 15*b* estimates a first determination criterion in the set of operation events associated with each other as the identical operations by extracting a character string or a numerical range commonly included in attribute elements in accordance with a condition set for each of the attribute elements. Further, the estimation unit 15*b* estimates a second determination criterion between sets of operation events associated with each other as the identical operations by performing comparison of the first determination criterion.

Describing using a specific example, in a case where a character string "input" common to all is included as an attribute value of an attribute element "operation type" (rule type A: determine a character string by an exact match) in a plurality of operation logs received as identical operation events by the reception unit 15*a*, the estimation unit 15*b* estimates an operation event in which the attribute element "operation type" exactly matches, as a determination criterion (first determination criterion) in an identical operation set. In addition, in a case where the attribute element "operation type" exactly matches between sets of the plurality of operation logs received as the identical operation events by the reception unit 15*a*, the estimation unit 15*b* estimates an operation event in which the attribute element "operation type" exactly matches, as a determination criterion (second determination criterion) between identical operation sets, that is, a final determination criterion. Note that estimation processing described above will also be described in detail in [Details of each of pieces of processing] (4. Rule estimation processing for each attribute value) described later.

In addition, the estimation unit 15*b* acquires a set of operation logs output by the reception unit 15*a* and a rule type of the attribute value stored in the storage unit 14, and extracts a character string or a numerical range commonly included as a determination criterion. Further, the estimation unit 15*b* may extract a pattern in which a set of a plurality of operation logs satisfies the rule type of the attribute value as the determination criterion. On the other hand, the estimation unit 15*b* outputs the extracted determination criterion to the determination unit 15*c*. Note that the estimation unit 15*b* may store the extracted determination criterion in the storage unit 14.

(Determination Unit 15*c*)

The determination unit 15*c* determines the identity for an operation event to be processed as a log event to be processed on the basis of the determination criterion. For example, the determination unit 15*c* determines the identity for the operation event to be processed by using the extracted attribute value. That is, the determination unit 15*c* determines the identity for the operation event to be processed by matching an operation event including the character string or an operation event satisfying the numerical range by using the first determination criterion. Further, the determination unit 15*c* determines the identity for the operation event to be processed by matching a result of adoption of the condition set for each of the attribute elements by using the second determination criterion.

Describing using a specific example, in a case where a fact that the attribute element "operation type" exactly matches is estimated as a determination criterion (first determination criterion) in the identical operation set, the determination unit 15*c* estimates the fact that the "operation type" exactly matches as a condition for determining the identity of the operation events. Further, in a case where an operation event in which the attribute element "operation type" exactly matches is estimated as a final determination criterion as a determination criterion (second determination criterion) between the identical operation sets, the determination unit 15c searches for an operation event that exactly matches the attribute element "operation type" from operation events not connected by the user, and outputs the found operation event as a determination result. Note that the determination processing described above will also be described in detail in [Details of each of pieces of processing] (5. Operation event determination processing) described later.

In addition, the determination unit 15c transmits the output determination result to the output unit 12. Note that the determination unit 15c may store the output determination result in the storage unit 14.

In addition, the determination unit 15c determines the identity for the operation event to be processed by presenting the determination result obtained by determining the identity to the user and outputting the determination result approved by the user.

Describing using a specific example, in a case where operation events in which the attribute element "operation type" exactly matches are output as the identical operation events in a plurality of visual images, the determination unit 15c outputs again an operation event of which the visual image is selected by the click operation by the user as a confirmed determination result. Note that the estimation processing described above will also be described in detail in [Details of each of pieces of processing] (6. Determination processing by interaction with user) described later.

[Details of Each of Pieces of Processing]

Details of each of pieces of processing according to the present embodiment will be described by using FIGS. 3 to 6, mathematical expressions, and the like. Hereinafter, detailed description will be given of processing of receiving exemplification by connection of operation events, a rule type for each attribute value, rule details and rule estimation processing, and operation event determination processing.

(1. Processing of Receiving Exemplification By Connection of Operation Events)

Figure 3:
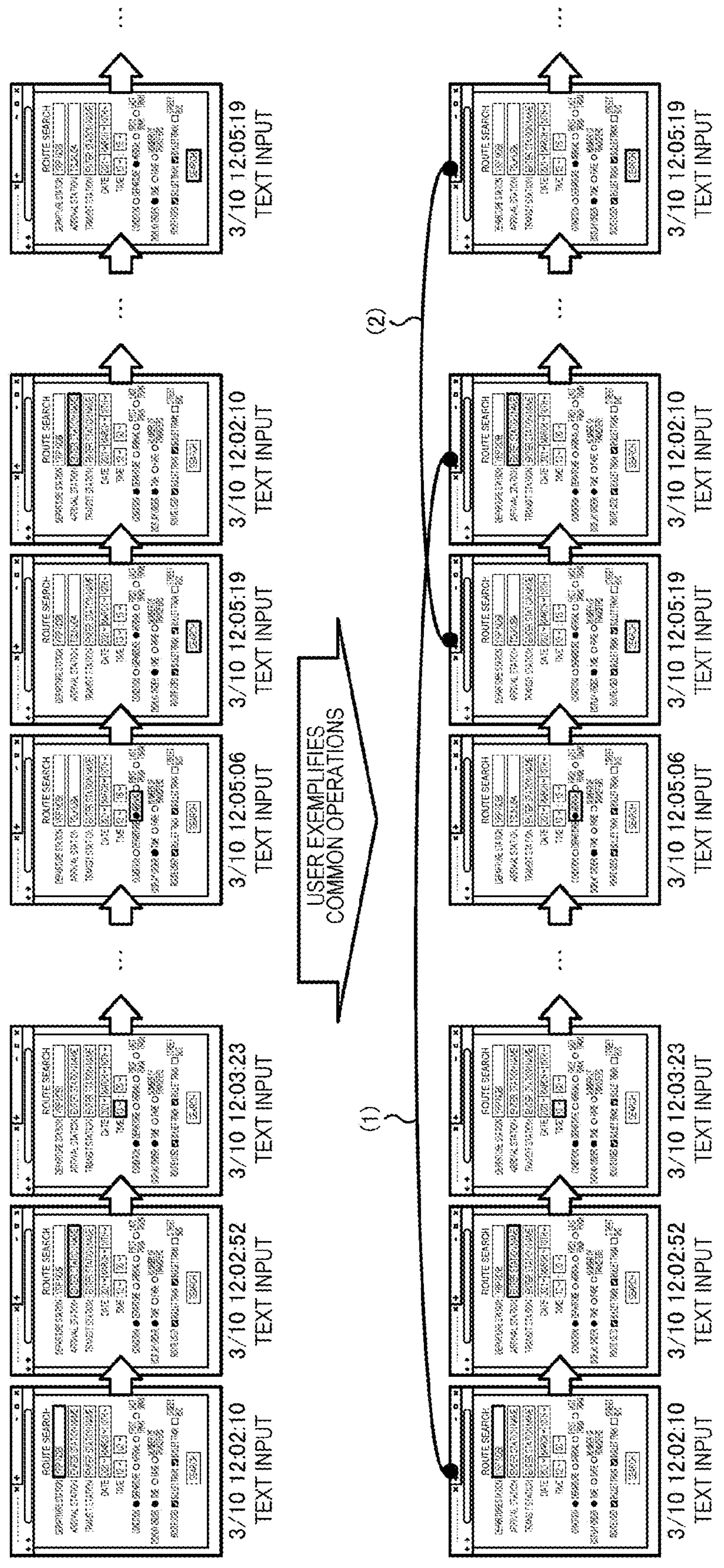
FIG. 3 is a diagram illustrating an example of processing of receiving exemplification by connection of operation events according to the first embodiment.

Processing of receiving exemplification by connection of operation events will be described with reference to FIG. 3. FIG. 3 is a diagram illustrating an example of the processing of receiving exemplification by connection of operation events according to the first embodiment.

First, the user is caused to exemplify one or more combinations of the identical operations. For example, as illustrated in FIG. 3, the operation events may be visually displayed chronologically, and the user may be caused to associate the identical operations with each other. In FIG. 3, one operation event is displayed as one node, a captured image recorded simultaneously with recording of the operation event is displayed on the node, and an operation position is displayed in a thick frame on the image. By performing display in this manner, the user can recognize which operation each operation event specifically is without understanding contents recorded in the operation log.

Then, the determination device 10 receives operation events connected with each other by the user as the user's exemplification. In FIG. 3, each connection is a combination of two operation events (see (1) and (2) of FIG. 3), but may be a combination of three or more operation events.

(2. Rule Type for Each Attribute Value)

The rule type for each attribute value will be described with reference to FIG. 4. FIG. 4 is a diagram illustrating an example of the rule type for each attribute value according to the first embodiment.

The determination device 10 applies the following four types of rules also illustrated in FIG. 4 in accordance with a nature of each attribute value of the operation event. The first rule is "determine a character string by an exact match" (rule type A), the second rule is "determine a character string by a partial match" (rule type B), the third rule is "perform determination by a numerical range" (rule type C), and the fourth rule is "not used for determination" (rule type D).

As illustrated in FIG. 4, the user connects the attribute element with the rule type to be used in advance. For example, in FIG. 4, the rule type A is applied to attribute elements of "operation type", "tagName", "type", "id", and "name", the rule type B is applied to attribute elements of "URL" and "title", the rule type C is applied to attribute elements of "width" and "height", and the rule type D is applied to attribute elements of "date and time", "value", "className", "left", and "top". Note that the user may not use some of the above four types of rules or may add other types of rules.

(3. Details of Rule for Each Attribute Value)

Prior to the rule estimation processing, details of the rule for each attribute value will be described. Hereinafter, description will be given of a character string determined by an exact match (rule details 1), a character string determined by a partial match (rule details 2), and an item determined by a numerical range (rule details 3) in this order.

(Rule details 1: Character String Determined By Exact Match)

First, details of a rule for determining a character string by an exact match (rule type A) will be described. Hereinafter, description will be given in the order of rule estimation processing 1 to which the rule type A is applied (first stage), rule estimation processing 2 to which the rule type A is applied (second stage), and rule matching processing.

(Rule Estimation Processing 1: Estimation Processing in Identical Operation Set)

In a case where all the attribute values exactly match in the exemplified identical operation set, the determination device 10 adopts the present rule for the corresponding attribute element. On the other hand, in a case where the attribute values do not exactly match in the exemplified identical operation set, the determination device 10 rejects the present rule for the corresponding attribute element. Note that, also in a case where all the attribute values are "null" in the exemplified identical operation set, the present rule is adopted for the corresponding attribute element.

(Rule Estimation Processing 2: Estimation Processing Between Identical Operation Sets)

In a relationship between a plurality of identical operation sets, if there is a rejected identical operation set, the determination device 10 rejects the identical operation sets as a whole.

(Rule Matching Processing)

In a case where corresponding attribute values exactly match between operation events to be compared, the determination device 10 determines that the present rule is a match (matched). In addition, in a case where it is not necessary to distinguish between upper case and lower case, the determination device 10 performs comparison using a value obtained by converting the corresponding attribute values into upper case or lower case.

(Rule Details 2: Character String Determined By Partial Match)

Second, details of a rule for determining a character string by a partial match (rule type B) will be described. Hereinafter, description will be given in the order of rule estimation processing 1 to which the rule type B is applied (first stage), rule estimation processing 2 to which the rule type B is applied (second stage), and rule matching processing.

(Rule Estimation Processing 1: Estimation Processing in Identical Operation Set)

In a case where "null" is included in the corresponding attribute value in the exemplified identical operation set, the determination device 10 rejects the present rule for the corresponding attribute element. On the other hand, the determination device 10 finds the longest common partial character string in the exemplified identical operation set. At this time, a ratio of the length of the common partial character string to the length of the attribute value with the maximum number of characters in the exemplified identical operation set is obtained as a lowest matching ratio (matching rate), and this lowest matching ratio is used as a parameter of the present rule. Then, in a case where the lowest matching ratio is less than or equal to a threshold, the determination device 10 rejects the present rule.

Note that the above threshold can be arbitrarily set, but for example, it is sufficient that the rule is rejected in a case where the ratio is less than or equal to 50%. In addition, to perform more advanced processing, information regarding true/false of "forward match", "backward match", "partial match", and "exact match" may be considered, a plurality of common parts may be considered, or a character string length may be considered.

(Rule Estimation Processing 2: Estimation Processing Between Identical Operation Sets)

Among the plurality of operation event sets to be compared, if there is a rejected identical operation set, the determination device 10 rejects the operation event sets as a whole. In addition, the determination device 10 sets the minimum lowest matching ratio among the plurality of operation event sets to be compared as a parameter of the whole.

(Rule Matching Processing)

In a case where a ratio of the longest common partial character string of the corresponding attribute value exceeds the lowest matching ratio between the operation events to be compared, the determination device 10 determines that the present rule is a match (matched). In addition, in a case where it is not necessary to distinguish between upper case and lower case, the determination device 10 performs comparison using a value obtained by converting the corresponding attribute values into upper case or lower case.

(Rule Details 3: Item Determined By Numerical Range)

Third, details of a rule for determination by a numerical range (rule type C) will be described. Hereinafter, description will be given in the order of rule estimation processing 1 to which the rule type C is applied (first stage), rule estimation processing 2 to which the rule type C is applied (second stage), and rule matching processing.

(Rule estimation Processing 1: Estimation Processing in Identical Operation Set)

In the exemplified identical operation set, "in a case where null is included in the corresponding attribute value", "in a case where a value that cannot be handled as a numerical value is included in the corresponding attribute value", or "in a case where another abnormal value is included in the corresponding attribute value (example: width is a negative value)", the determination device 10 rejects the present rule for the corresponding attribute element.

In addition, the determination device 10 calculates a standard deviation σ in the exemplified identical operation set, and uses the standard deviation o as a parameter of the present rule. At this time, the determination device 10 may reject the present rule in a case where the standard deviation σ is greater than or equal to a certain threshold or in a case where a sufficient number of operations are not exemplified (only one operation is exemplified). For example, in a case where the threshold is set to 30, and in a case where the standard deviation σ is greater than or equal to 30, it is regarded that the variation is large and there is almost no commonality, and the rule is rejected.

(Rule Estimation Processing 2: Estimation Processing Between Identical Operation Sets)

Among the plurality of operation event sets to be compared, if there is a rejected identical operation set, the determination device 10 rejects the operation event sets as a whole. In addition, the determination device 10 sets the maximum standard deviation o among the plurality of operation event sets to be compared as a parameter of the whole.

(Rule Matching Processing)

In a case where the corresponding attribute value falls within a range of (an absolute value of a difference between values of two attribute elements)≤2 kσ between the operation events to be compared, the determination device 10 determines that the present rule is a match (matched). Here, k is a constant and is arbitrarily determined. In addition, in a case where it is assumed that variation of values follows a normal distribution, k=3 (range of 99.7%) is generally preferable.

(4. Rule Estimation Processing for Each Attribute Value)

Details of processing of estimating the rule for each attribute value will be described with reference to FIG. 5. FIG. 5 is a diagram illustrating an example of determination criterion estimation processing according to the first embodiment. As described below, first, as the first stage, the determination device 10 estimates a rule for each operation event group exemplified as the identical operations. Next, as the second stage, a rule is further estimated based on a relationship between a plurality of identical operation sets. FIG. 5 illustrates two identical operation sets including two exemplified operation events (see upper and lower parts in FIG. 5).

(First Stage)

As the estimation processing at the first stage, rule estimation in the exemplified identical operation set will be described. First, the determination device 10 determines "adopted" or "rejected" for each attribute element in accordance with a rule type set in advance for each attribute element. Next, the determination device 10 extracts a parameter from an attribute value of an attribute element determined as "adopted" in accordance with the rule type set in advance for each attribute element. Then, the determination device 10 estimates whether it is "adopted" or "rejected", or the extracted parameter for each attribute element as a rule (first determination criterion) corresponding to the attribute element.

In the example in the upper part of FIG. 5, as the attribute value of the attribute element "operation type" (rule type A: determine a character string by an exact match), the character string "input" exactly matches, so that the determination device 10 determines the attribute element as "adopted". In addition, in the example in the lower part of FIG. 5, as the attribute value of the attribute element "operation type" (rule type A: determine a character string by an exact match), the character string "click" exactly matches, so that the determination device 10 determines the attribute element as "adopted".

In addition, in the examples in the upper and lower parts of FIG. 5, as the attribute value of the attribute element "URL" (rule type B: determine a character string by a partial match), only the last one of 41 characters is different, so that the determination device 10 calculates 97% (40/41=0.976) as the matching rate, and determines the attribute element as "adopted".

(Second Stage)

As the estimation processing at the second stage, processing of confirming consistency between a plurality of exemplified identical operation sets will be described. First, the determination device 10 compares determinations whether it is "adopted" or "rejected" of respective attribute elements in the plurality of identical operation sets. At this time, among the plurality of identical operation sets to be compared, if there is a rejected identical operation set, the determination device 10 rejects the identical operation sets as a whole. Then, the determination device 10 estimates a pattern of "adopted" or "rejected" of each matched attribute element as a rule (second determination criterion). That is, the estimation processing at the second stage can be said to be processing of finding a rule as to which attribute value is common in the operations included in the identical operation set.

In the example of FIG. 5, since the attribute element "operation type" of the identical operation set in the upper part is determined as "adopted" and the attribute element "operation type" of the identical operation set in the lower stage is also determined as "adopted", the determination device 10 estimates the fact that the "operation type" exactly matches as a condition for determining the identity of the operation events. Similarly, the determination device 10 compares determinations whether it is "adopted" or "rejected" for other attribute elements. In FIG. 5, since all the patterns of "adopted" or "rejected" of the identical operation set in the upper and lower parts match each other, the determination device 10 estimates the pattern as the final determination criterion.

(5. Operation Event Determination Processing)

Figure 6:
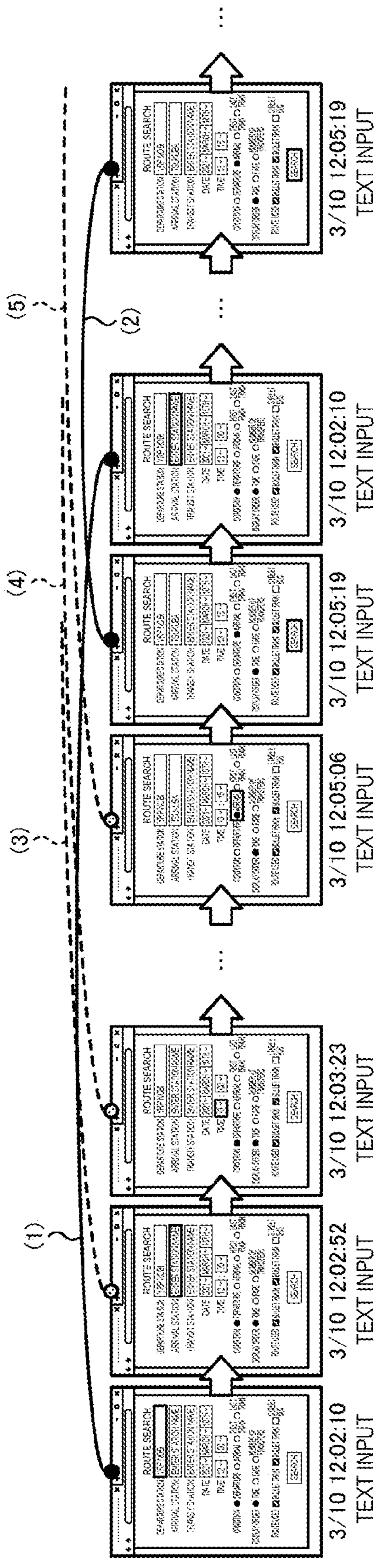
FIG. 6 is a diagram illustrating an example of operation event determination processing according to the first embodiment.

Details of processing of determining identical operation events from the estimated rule will be described with reference to FIG. 6. FIG. 6 is a diagram illustrating an example of operation event determination processing according to the first embodiment. The determination device 10 uses the estimated rule to check the rule for an operation event other than the exemplified operation event and determine the identity.

In the example of FIG. 6, the determination device 10 uses a rule (example: a pattern of "adopted" or "rejected" of each attribute element) between operation event sets estimated from a plurality of exemplified operation event sets (see (1) and (2) of FIG. 6) to determine the identity for an operation event that is not exemplified, and outputs a combination of identical operation events (see (3), (4), and (5) of FIG. 6).

In addition, the determination device 10 may use a rule (example: a parameter of each attribute element) in the operation event set estimated from an exemplified operation event set to determine the identity for an operation event that is not exemplified, and output identical operation events that are not exemplified.

(6. Determination Processing by Interaction with User)

Hereinafter, details of processing of determining an operation event by interaction with the user will be described. In some cases, the determination device 10 cannot correctly determine the identity of the operation events, such as a case where the number of the exemplified operation events described above is small or a case where variety of the exemplified operation events is insufficient. For that reason, instead of immediately confirming the determination result, the determination device 10 can temporarily indicate a determined operation event to the user, and confirm the determination result after confirmation from the user. That is, in a case where the presented determination result is determined to be inappropriate by the user, the determination device 10 can also prompt the user to cancel the temporary determination result once and increase the number of exemplifications.

By gradually increasing the number of exemplifications by such interactive exchange, it is possible to cause the user to more efficiently exemplify operation events. Further, by providing a user interface (UI) that allows ON/OFF of various set thresholds and rules adopted by estimation, it is also possible to respond more advanced user requirements.

[Flow of Each of Pieces of Processing]

Figure 7:
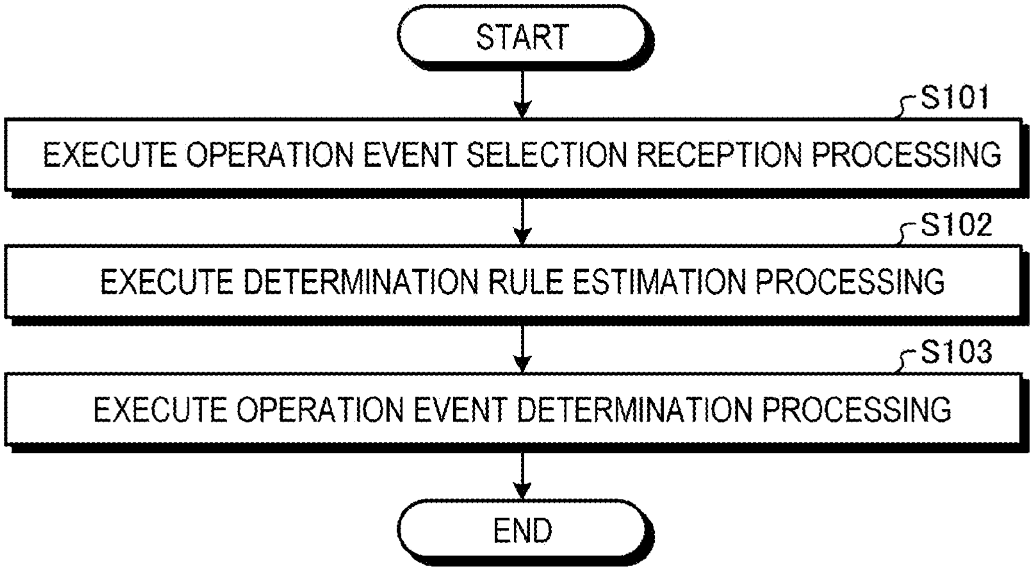
FIG. 7 is a flowchart illustrating an example of a flow of entire processing according to the first embodiment.

A flow of each of pieces of processing according to the present embodiment will be described in detail with reference to FIG. 7. FIG. 7 is a flowchart illustrating an example of a flow of entire processing according to the first embodiment. Hereinafter, a flow of the entire determination processing will be described, and an outline of each of pieces of processing will be described.

(Flow of Entire Processing)

First, the reception unit 15*a* of the determination device 10 executes operation event selection reception processing (step S101). Next, the estimation unit 15*b* of the determination device 10 executes determination rule estimation processing (step S102). Then, the determination unit 15*c* of the determination device 10 executes operation event determination processing (step S103), and ends the processing. Note that the following steps S101 to S103 can be executed in different orders. In addition, there may be omitted processing among the following steps S101 to S103.

(Flow of Each of Pieces of Processing)

First, the operation-event selection reception processing by the reception unit 15*a* will be described. In this processing, the user is caused to exemplify one or more combinations of identical operation events, and operation logs of the exemplified identical operation events are received. At this time, by visually displaying the operation events chronologically and causing the user to select a connection, the user can recognize which operation each operation event specifically is without understanding a content of an attribute value recorded in the operation log.

Second, the determination rule estimation processing by the estimation unit 15*b* will be described. In this processing, in accordance with a rule type set in advance for each attribute element of the operation event for which selection is received, "adopted" or "rejected" is determined for each attribute element, a parameter is extracted from an attribute value of the attribute element determined as "adopted", and the extracted parameter is estimated as a rule corresponding to the attribute element. At this time, by connecting the attribute element with the rule type to be used in advance, it is possible to effectively estimate a determination rule of the selected operation event. In addition, in this processing, a rule for the user to determine identity can also be estimated from the pattern of "adopted" or "rejected" of each attribute element, and identical operation events can be estimated in addition to the exemplified operation events.

Third, the determination rule estimation processing by the determination unit 15*c* will be described. In this processing, the estimated determination rule is used to check the rule for operation events other than the exemplified operation events, and identical operation events are determined. At this time, by temporarily indicating the determined operation event to the user instead of immediately confirming the determination result, and confirming the determination result of the identical operation events after confirmation from the user, it is possible to prompt the user to gradually increase the number of exemplifications by interactive exchange, and it is possible to easily and effectively determine the identical operation events.

[Effects of First Embodiment]

First, in the determination processing according to the present embodiment described above, operation events are received, a determination criterion is estimated for determining the identity of the operation events on the basis of an attribute value of an operation log included in the operation events, and the identity is determined for the operation event to be processed on the basis of the estimated determination criterion, and for this reason, in the present processing, identical operation events can be easily connected with each other in pre-processing for process mining.

Figure 8:
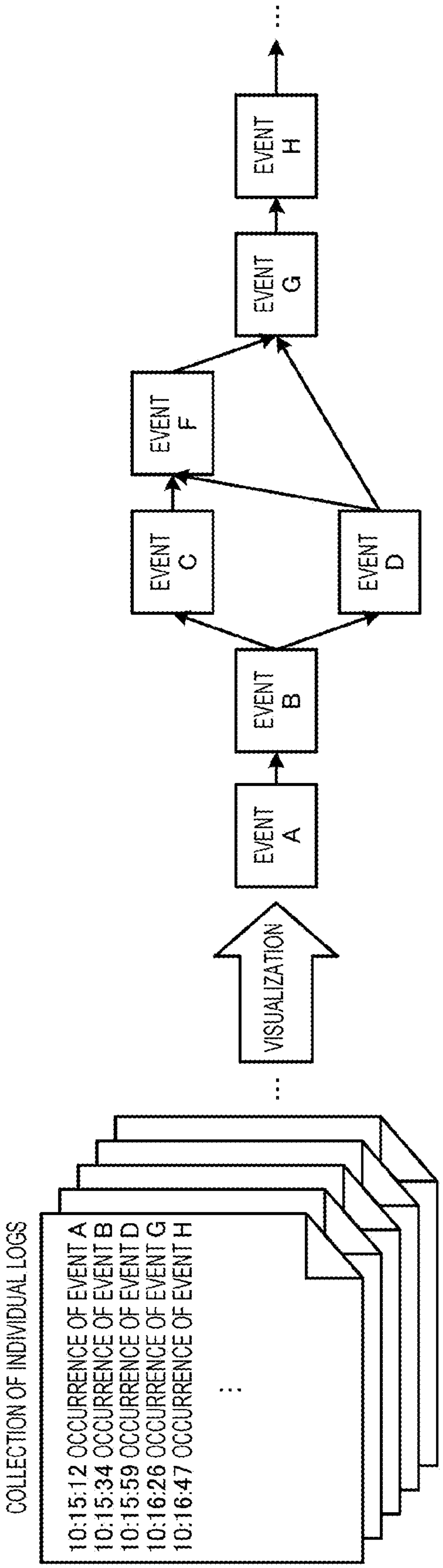
FIG. 8 is a diagram for explaining process mining.

Here, the process mining will be described. In the process mining, as illustrated in FIG. 8, it is possible to analyze a flow of work performed in business by visualizing the order and relationship of events. FIG. 8 is a diagram for explaining the process mining.

Figure 9:
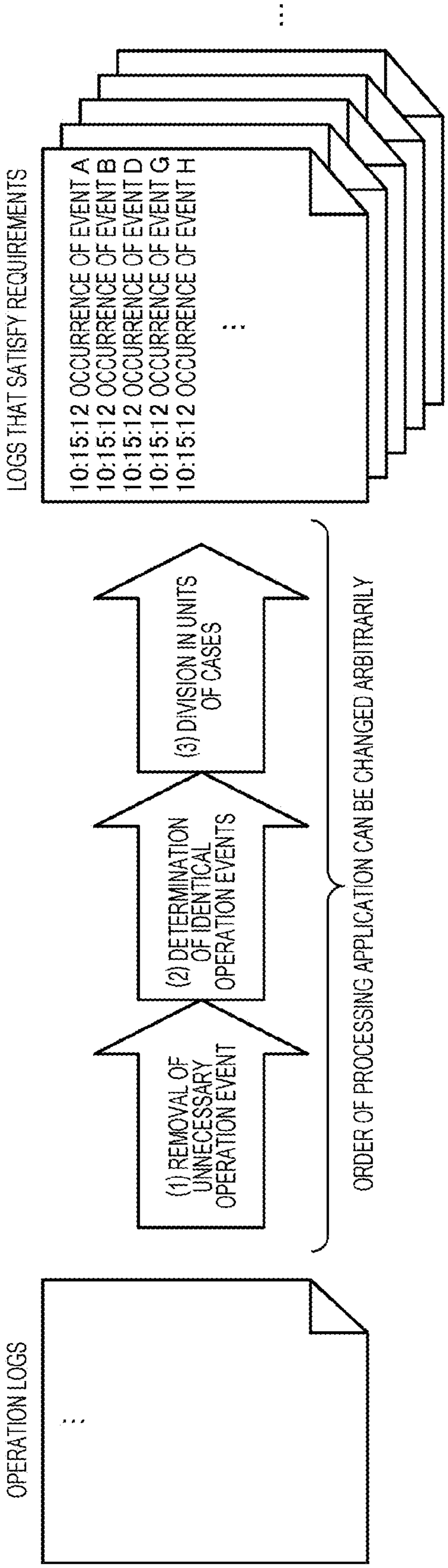
FIG. 9 is a diagram for explaining pre-processing for process mining.

In such process mining, as illustrated in FIG. 9, when the process mining is performed, for example, “removal of an unnecessary operation event”, “determination of identical operation events”, and “division in units of cases” are required as the pre-processing. FIG. 9 is a diagram for explaining the pre-processing for the process mining.

Conventionally, such pre-processing is performed manually. For example, when such pre-processing is manually performed, as illustrated in FIG. 10, the user at a site can intuitively exemplify operation events from screen capture, but it may not be easy to process operation logs. FIG. 10 is a diagram for explaining a conventional problem. For example, the attribute value recorded in the operation log requires specialized knowledge for interpretation. For example, to interpret the meaning of the operation log in which the operation on the browser is recorded, knowledge of hyper text markup language (HTML) or DOM is required. In addition, URLs and the like may not be completely the same even in the same page. In addition, for example, in a case where a session ID is included, since a part of the URL changes every time login is performed, it is necessary to estimate a URL generation rule to determine the identity of the URL.

As described above, since there is no relationship between appearance in the screen and an internal structure (such as a method of assigning an ID), the internal structure cannot be estimated from similarity in appearance that can be determined by a general user. Since there are various internal structures in the screen, the best determination cannot always be made by a fixed algorithm. A user having specialized knowledge can cope with various screen structures by estimating a rule from a tendency of the operation log and constructing an algorithm, but it is difficult for a general user.

For this reason, in a case where division of the operation log in units of cases is manually performed, it is necessary for a worker to understand an internal structure of a system and a meaning of an attribute value of the operation log, and further, it requires a large operation to handle a large amount of logs, and in addition, in a fixed rule algorithm, systems have different internal structures, so that there has been a problem that it is difficult to automatically divide the operation log in units of cases. On the other hand, in the determination processing according to the present embodiment, the identical operation events can be easily connected with each other in the pre-processing for the process mining. In addition, effects that can be achieved by the determination processing according to the present embodiment will be further described below.

In the determination processing according to the present embodiment described above, among images of a plurality of operation events, images of operation events associated with each other by the user as identical operations are received, the determination criterion is estimated by extracting the common attribute value of the operation log, and the identity is determined for the operation event to be processed by using the extracted attribute value. For this reason, in the present processing, in the pre-processing for the process mining, the identical operation events can be easily connected with each other by using the common attribute value of the operation log on the basis of the operation of the image.

In the determination processing according to the present embodiment described above, among captured images of a plurality of operation events displayed in chronological order, a combination of the captured images associated with each other by the user as identical operations is received, the first determination criterion in a set of the operation events associated with each other as identical operations is estimated by extracting a character string or a numerical range commonly included in attribute elements in accordance with a condition set for each of the attribute elements, and the identity is determined for the operation event to be processed by matching an operation event including the character string or an operation event satisfying the numerical range by using the first determination criterion. For this reason, in the present processing, in the pre-processing for the process mining, the identical operation events can be easily connected with each other by using the common attribute value of the operation log on the basis of the operation of the image in accordance with the condition set for each of the attribute elements.

In the determination processing according to the present embodiment described above, the second determination criterion between sets of the operation events associated with each other as identical operations is further estimated by performing comparison of the first determination criterion, and the identity is determined for the operation event to be processed by matching a result of adoption of the condition set for each of the attribute elements by using the second determination criterion. For this reason, in the present processing, in the pre-processing for the process mining, a plurality of identical operation event sets can be easily connected with each other by using the common attribute value of the operation log on the basis of the operation of the image in accordance with the condition set for each of the attribute elements.

In the determination processing according to the present embodiment described above, the identity is determined for the operation event to be processed by presenting the determination result obtained by determining the identity to the user and outputting the determination result approved by the user. For this reason, in the present processing, in the pre-processing for the process mining, the identical operation events can be easily and more effectively connected with each other.

[System Configuration or the Like]

Each component of each device that has been illustrated according to the embodiment described above is functionally conceptual and does not necessarily have to be physically configured as illustrated. In other words, a specific form of distribution and integration of individual devices is not limited to the illustrated form, and all or part of the configuration can be functionally or physically distributed and integrated in any unit according to various loads, usage conditions, and the like. Further, all or some of the processing functions performed in each device can be implemented by a CPU and a program to be analyzed and executed by the CPU or can be implemented as hardware by wired logic.

In addition, among the pieces of processing described in the embodiment described above, all or part of the processing described as being automatically performed can be manually performed, or all or part of the processing described as being manually performed can be automatically performed by a known method. The processing procedure, the control procedure, the specific name, and the information including various types of data and parameters that are illustrated in the literatures and the drawings can be freely changed unless otherwise specified.

[Program]

In addition, it is also possible to create a program in which the processing executed by the determination device 10 described in the above embodiment is described in a language that can be executed by a computer. In this case, the computer executes the program, and thus the advantageous effects similar to those of the above-described embodiment can be obtained. Further, processing similar to that of the foregoing embodiment may be implemented by recording the program on a computer-readable recording medium and reading and executing the program recorded in the recording medium.

Figure 11:
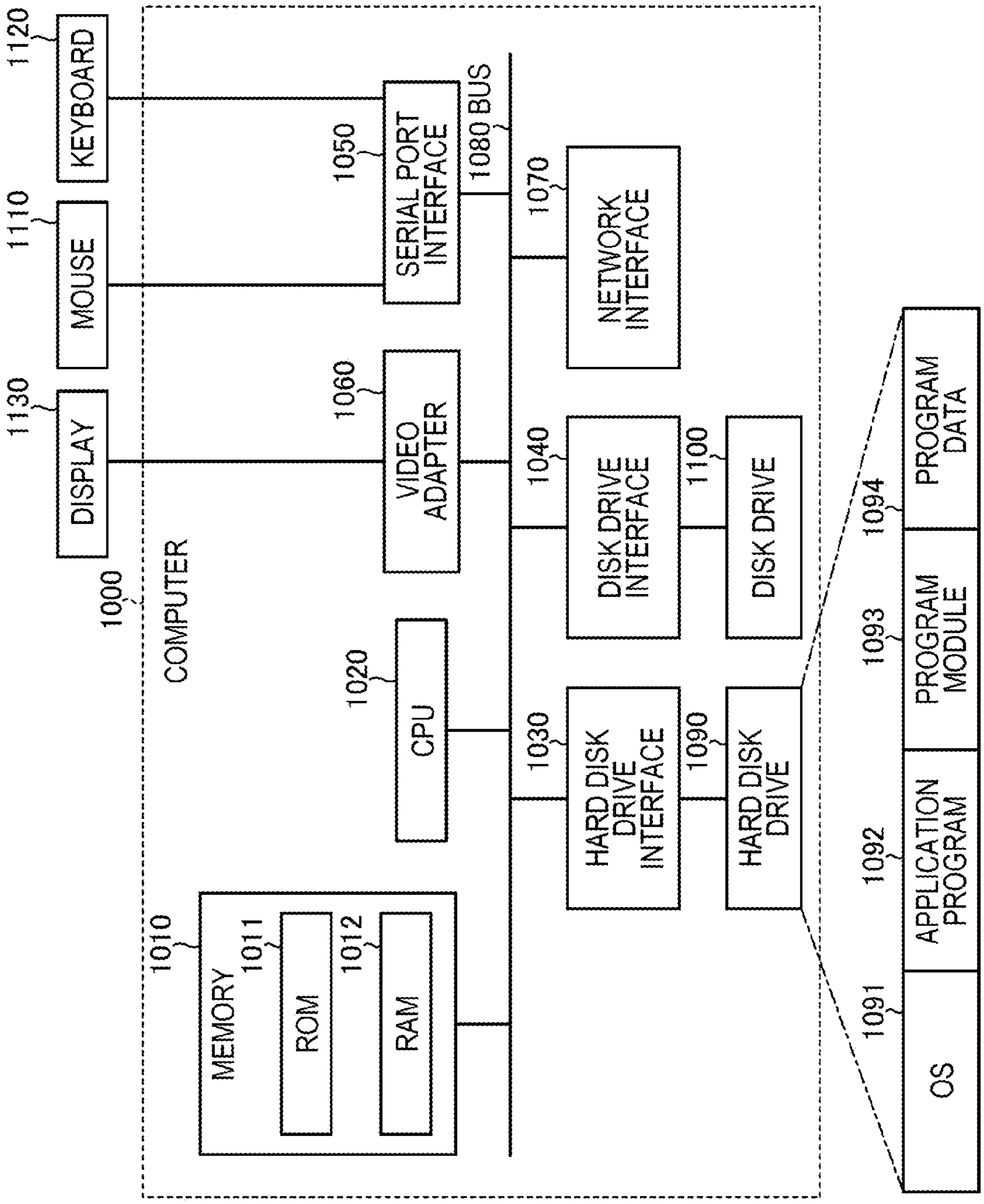
FIG. 11 is a diagram illustrating a computer that executes a program.

FIG. 11 is a diagram illustrating a computer that executes the program. As illustrated in FIG. 11, a computer 1000 includes a memory 1010, a CPU 1020, a hard disk drive interface 1030, a disk drive interface 1040, a serial port interface 1050, a video adapter 1060, and a network interface 1070, for example, and these units are connected to each other by a bus 1080.

As illustrated in FIG. 11, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 11. The disk drive interface 1040 is connected to a disk drive 1100 as illustrated in FIG. 11. For example, a removable storage medium such as a magnetic disk or an optical disk is inserted into the disk drive 1100. As illustrated in FIG. 11, the serial port interface 1050 is connected to, for example, a mouse 1110 and a keyboard 1120. As illustrated in FIG. 11, the video adapter 1060 is connected to, for example, a display 1130.

Here, as illustrated in FIG. 11, the hard disk drive 1090 stores, for example, an OS 1091, an application program 1092, a program module 1093, and program data 1094. In other words, the above program is stored, for example, in the hard disk drive 1090 as a program module in which a command to be executed by the computer 1000 is described.

In addition, various data described in the embodiment described above is stored as program data in, for example, the memory 1010 and the hard disk drive 1090. Then, the CPU 1020 reads the program module 1093 and the program data 1094 stored in the memory 1010 and the hard disk drive 1090 to the RAM 1012 as necessary and executes various processing procedures.

Note that the program module 1093 and the program data 1094 related to the program are not limited to being stored in the hard disk drive 1090 and may be stored in, for example, a removable storage medium and may be read by the CPU 1020 via a disk drive, or the like. Alternatively, the program module 1093 and the program data 1094 related to the program may be stored in another computer connected via a network (such as a local area network (LAN) or a wide area network (WAN)) and may be read by the CPU 1020 via the network interface 1070.

The embodiment described above and modifications thereof are included in the inventions recited in the claims and the equivalent scope thereof, similarly to being included in the technique disclosed in the present application.

REFERENCE SIGNS LIST

10 determination device
11 input unit
12 output unit
13 communication unit
14 storage unit
15 control unit
15*a* reception unit
15*b* estimation unit
15*c* determination unit

The invention claimed is:

1. A determination device comprising a processor configured to execute operations comprising:

creating a series of screenshot images of graphical user interface for enabling interactive user selections of a plurality of screenshot images that are semantically identical;

receiving a plurality of log events according to the interactive selections of a pair of screenshot images of graphical user interface as specified by a user as semantically identical user operations in the series of the screenshot images, wherein a log event of the log events comprises an attribute value of an exemplary operation while using the graphical user interface;

estimating a determination criterion for determining semantic identity of the plurality of log events as semantically identical on a basis of an attribute value of a respective log in the log events according to the interactively selected pair of screenshot images; and automatically determining semantic identity of a target log event on a basis of the estimated determination criterion to provide visual presentation of the target log event as an improvement point of user operations.

2. The determination device according to claim 1, wherein the receiving further comprises receiving, as the log events, the screenshot images of operation events associated with each other by a user as identical operations among the screenshot images of a plurality of operation events, the estimating further comprises estimating the determination criterion by extracting the attribute value common of an operation log as the log, and the determining further comprises determining identity for an operation event to be processed by using the attribute value extracted.

3. The determination device according to claim 2, wherein the receiving further comprises receiving, among captured screenshot images of the plurality of operation events displayed in chronological order, a combination of the captured screenshot images associated with each other by the user as identical operations, the estimating further comprises estimating a first determination criterion in a set of the operation events associated with each other as identical operations by extracting a character string or a numerical range commonly included in attribute elements in accordance with a condition set for each of the attribute elements, and the determining further comprises determining identity for the operation event to be processed by matching an operation event including the character string or an operation event satisfying the numerical range by using the first determination criterion.

4. The determination device according to claim 3, wherein the estimating further comprises estimating a second determination criterion between sets of the operation events associated with each other as identical operations by performing comparison of the first determination criterion, and the determining further comprises determining identity for the operation event to be processed by matching a result of adoption of the condition set for each of the attribute elements by using the second determination criterion.

5. The determination device according to claim 4, wherein the determining further comprises determining identity for the operation event to be processed by presenting a determination result obtained by determining identity to the user and outputting the determination result approved by the user.

6. A determination method, comprising:

creating a series of screenshot images of graphical user interface for enabling interactive user selections of a plurality of screenshot images that are semantically identical;

receiving a plurality of log events according to the interactive selections of a pair of screenshot images of graphical user interface as specified by a user as semantically identical user operations in the series of the screenshot images, wherein a log event of the log events comprises an attribute value of an exemplary operation while using the graphical user interface;

estimating a determination criterion for determining semantic identity of the plurality of log events as semantically identical on a basis of an attribute value of a respective log in the log events according to the interactively selected pair of screenshot images; and automatically determining semantic identity of a target log event on a basis of the estimated determination criterion to provide visual presentation of the target log event as an improvement point of user operations.

7. A computer-readable non-transitory recording medium storing a computer-executable program instructions that when executed by a processor cause a computer system to execute operations comprising:

creating a series of screenshot images of graphical user interface for enabling interactive user selections of a plurality of screenshot images that are semantically identical;

receiving a plurality of log events according to the interactive selections of a pair of screenshot images of graphical user interface as specified by a user as semantically identical user operations in the series of the screenshot images, wherein a log event of the log events comprises an attribute value of an exemplary operation while using the graphical user interface;

estimating a determination criterion for determining semantic identity of the plurality of log events as semantically identical on a basis of an attribute value of a respective log included in the log events according to the interactively selected pair of screenshot images; and automatically determining semantic identity of a target log event on a basis of the estimated determination criterion to provide visual presentation of the target log event as an improvement point of user operations.

8. The determination device according to claim 1, wherein the determination criterion is based on an exact match of character strings of attribute values of logs in the log events.

9. The determination device according to claim 1, wherein the determination criterion is based on a partial match of the character strings of attribute values of the logs in the log events.

10. The determination device according to claim 1, wherein the determination criterion is based on numerical ranges of attribute values of the logs in the log events.

11. The determination device according to claim 1, wherein the determination criterion is based on not to use attribute values of the logs in the log events.

12. The determination device according to claim 1, wherein the estimating the determination criterion uses a predetermined mapping between an attribute element of the log in the log events and the determination criterion.

13. The determination method according to claim 6, wherein the receiving further comprises receiving, as the log events, the screenshot images of operation events associated with each other by a user as identical operations among the screenshot images of a plurality of operation events, the estimating further comprises estimating the determination criterion by extracting the attribute value common of an operation log as the log, and the determining further comprises determining identity for an operation event to be processed by using the attribute value extracted.

14. The determination method according to claim 13, wherein the receiving further comprises receiving, among captured screenshot images of the plurality of operation events displayed in chronological order, a combination of the captured images associated with each other by the user as identical operations, the estimating further comprises estimating a first determination criterion in a set of the operation events associated with each other as identical operations by extracting a character string or a numerical range commonly included in attribute elements in accordance with a condition set for each of the attribute elements, and the determining further comprises determining identity for the operation event to be processed by matching an operation event including the character string or an operation event satisfying the numerical range by using the first determination criterion.

15. The determination method according to claim 14, wherein the estimating further comprises estimating a second determination criterion between sets of the operation events associated with each other as identical operations by performing comparison of the first determination criterion, and the determining further comprises determining identity for the operation event to be processed by matching a result of adoption of the condition set for each of the attribute elements by using the second determination criterion.

16. The determination method according to claim 15, wherein the determining further comprises determining identity for the operation event to be processed by presenting a determination result obtained by determining identity to the user and outputting the determination result approved by the user.

17. The determination method according to claim 6, wherein the determination criterion is based on at least one of:

an exact match of character strings of attribute values of logs in the log events, a partial match of the character strings of the attribute values of the logs in the log events, numerical ranges of the attribute values of the logs in the log events, or not to use the attribute values of the logs in the log events.

18. The computer-readable non-transitory recording medium according to claim 7, wherein the receiving further comprises receiving, as the log events, the screenshot images of operation events associated with each other by a user as identical operations among the screenshot images of a plurality of operation events, the estimating further comprises estimating the determination criterion by extracting the attribute value common of an operation log as the log, and the determining further comprises determining identity for an operation event to be processed by using the attribute value extracted.

19. The computer-readable non-transitory recording medium according to claim 7, wherein the determination criterion is based on at least one of:

an exact match of character strings of attribute values of logs in the log events, a partial match of the character strings of the attribute values of the logs in the log events, numerical ranges of the attribute values of the logs in the log events, or not to use the attribute values of the logs in the log events.

20. The computer-readable non-transitory recording medium according to claim 18, wherein the receiving further comprises receiving, among captured screenshot images of the plurality of operation events displayed in chronological order, a combination of the captured screenshot images associated with each other by the user as identical operations, the estimating further comprises estimating a first determination criterion in a set of the operation events associated with each other as identical operations by extracting a character string or a numerical range commonly included in attribute elements in accordance with a condition set for each of the attribute elements, and the determining further comprises determining identity for the operation event to be processed by matching an operation event including the character string or an operation event satisfying the numerical range by using the first determination criterion.

* * * * *